(12) United States Patent
Ng et al.

(10) Patent No.: US 9,833,006 B2
(45) Date of Patent: Dec. 5, 2017

(54) STABLE FERMENTED MILK PRODUCTS AND METHODS

(71) Applicant: CP Kelco APS, Lille Skensved (DK)

(72) Inventors: Lian Ying Ng, Roedovre (DK); Soeren Bulow Riis, Roedovre (DK); Tina Benne Lohmann, Haslev (DK); Min Ling Marlene Tsao, Singapore (SG); Camilla Bjergegaard, Broenshoej (DK)

(73) Assignee: CP Kelco APS, Lille Skensved (DK)

( * ) Notice: Subject to any disclaimer, the term of this patent is extended or adjusted under 35 U.S.C. 154(b) by 304 days.

(21) Appl. No.: 13/780,681

(22) Filed: Feb. 28, 2013

(65) Prior Publication Data

US 2013/0259976 A1 Oct. 3, 2013

Related U.S. Application Data

(60) Provisional application No. 61/714,107, filed on Oct. 15, 2012, provisional application No. 61/619,737, filed on Apr. 3, 2012.

(51) Int. Cl.
*A23C 9/137* (2006.01)
*A23L 29/231* (2016.01)

(52) U.S. Cl.
CPC ............ *A23C 9/137* (2013.01); *A23L 29/231* (2016.08)

(58) Field of Classification Search
CPC .......... A23C 9/12; A23C 9/137; A23L 1/0524
See application file for complete search history.

(56) References Cited

U.S. PATENT DOCUMENTS

| | | | |
|---|---|---|---|
| 4,391,830 A | | 7/1983 | Gudnason et al. |
| 5,008,254 A | * | 4/1991 | Weibel ............................ 514/57 |
| 5,820,903 A | * | 10/1998 | Fleury et al. ................... 426/74 |
| 6,663,911 B2 | | 12/2003 | Valli et al. |
| 6,855,363 B1 | | 2/2005 | Buchholt |
| 7,396,552 B2 | * | 7/2008 | Ogasawara et al. .......... 426/580 |
| 2007/0160738 A1 | * | 7/2007 | Van Bokkelen et al. ..... 426/601 |
| 2007/0178213 A1 | * | 8/2007 | Ketchmark et al. .......... 426/583 |

(Continued)

FOREIGN PATENT DOCUMENTS

DE 102009019551 A1 12/2010
EP 0887020 A1 12/1998

(Continued)

OTHER PUBLICATIONS

J. Leroux et al. "Emulsion stabilizing properties of pectin" 2003 Food Hydrocolloids vol. 17 pp. 455-462.*

(Continued)

*Primary Examiner* — Felicia Turner
(74) *Attorney, Agent, or Firm* — Eversheds Sutherland (US) LLP

(57) ABSTRACT

Methods are provided for making a fermented milk product in which a stabilizing additive is introduced before fermentation. The methods generally include (1) combining milk and pectin to form a mixture, (2) heat treating the mixture, and (3) fermenting the mixture. In some embodiments, the methods further include combining the milk and pectin with a low acyl gellan gum. The methods also may include homogenizing the mixture before heat treating the mixture and/or after fermenting the mixture. Also provided in embodiments herein are fermented milk products.

24 Claims, 1 Drawing Sheet

(56) References Cited

U.S. PATENT DOCUMENTS

| | | | |
|---|---|---|---|
| 2007/0224314 A1* | 9/2007 | Horiuchi et al. | 426/43 |
| 2009/0035416 A1* | 2/2009 | Shimizu et al. | 426/43 |

FOREIGN PATENT DOCUMENTS

| | | |
|---|---|---|
| EP | 0958746 A1 | 11/1999 |
| EP | 1069138 A1 | 1/2001 |
| GB | 2314564 A | 7/1998 |
| JP | 2004-215563 A | 8/2004 |
| WO | 200040098 A1 | 7/2000 |
| WO | 2004105508 A1 | 9/2004 |
| WO | 2005016027 A1 | 2/2005 |
| WO | 2008086263 A1 | 7/2008 |
| WO | 2008148383 A1 | 12/2008 |
| WO | 2010089381 A2 | 8/2010 |
| WO | 2010115890 A1 | 10/2010 |
| WO | 2010129153 A2 | 11/2010 |

OTHER PUBLICATIONS

International Search Report dated Jun. 20, 2012 for corresponding International Application No. PCT/EP2012/060130.
Lara Matia-Merino et al., Acid-induced gelation of milk protein concentrates with added pectin: Effect of casein micelle dissociation, ScienceDirect, 2007, pp. 765-775, Food Hydrocolloids 21, Elsevier Ltd.
Lara Matia-Merino et al., Effects of low-methoxyl amidated pectin and ionic calcium on rheology and microstructure of acid-induced sodium caseinate gels, ScienceDirect, 2004, pp. 271-281, Food Hydrocolloids 18, Elsevier Ltd.
Klaus Stegler Bjerrum, New applications for pectins, Food Tech Europe, Mar./Apr. 1996, pp. 32-34, Copenhagen Pectin A/S, Denmark.
Douglas J. Wearly, Centrifugation and rheology as indicators of long term stability of an acidified protein matrix, Thesis to the Ohio State University, 2009, pp. 1-74, The Ohio State University, Ohio.
Written Opinion of the International Searching Authority for corresponding International Application No. PCT/EP2012/060130.
C. Lobato-Calleros et al., Microstructural and rheological properties of low-fat stirred yoghurts made with skim milk and multiple emulsions, Journal of Texture Studies, 2009, pp. 657-675, Wiley Periodicals, Inc.
P.E. Glahn, Hydrocolloid Stabilization of Protein Suspensions at Low pH, Prog. Fd. Nutr. Sci., vol. 6, pp. 171-177 (1982).
P.E. Glahn, Casein-Pectin Interaction in Sour-Milk Beverages, Food Ingredients Europe Conference Proceedings 1994, pp. 252-256, Process Press Europe, The Netherlands (1994).
PCT/EP2013/055410 International Search Report and Written Opinion dated Jun. 17, 2013.
Office Action issued in Japanese Application No. 2015-503804, dated Aug. 8, 2017 (English translation).
Sun-Waterhouse, et al., "Effects of Adding Apple Polyphenols Before and After Fermentation on the Properties of Drinking Yoghurt," Food Bioprocess Technol 2011, vol. 5, No. 7, pp. 2674-2686.
Schonbrun, The effects of various stabilizers on the mouthfeel and other attributes of drinkable yogurt, University of Florida, Master Thesis, 2002, Abstract, pp. 27-34.
Nielsen, C. F., "Pectin in Stirred Yoghurt. Theory and Praxis," Masters Thesis, Aalborg University, Jun. 2009.
Karagul-Yuceer, Y. et al. "Carbonated Yogurt—Sensory Properties and Consumer Acceptance," J. Dairy Sci. 1999, 82, 1394-1398.
Hess, S.J. et al. "Rheological Properties of Nonfat Yogurt Stabilized Using Lactobacillus delbrueckii ssp. bulgaricus Producing Exopolysaccharide of Using Commercial Stabilizer Systems," J. Dairy Sci. 1997, 80, 252-263.
Kiani, H. et al. "Effect of gellan, alone and in combination with high-methoxy pectin, on the structure and stability of doogh, a yogurt-based Iranian drink," Food Hydrocolloids, 24, 2010, 744-754.
Buchholt, Hans Christian, "Preparation and properties of enzymatically and chemically modified sugar beet pectins," Carbohydrate Polymers, 58, 2004, 149-161.
Neirynck, N. et al. "Influence of pH and biopolymer ratio on whey protein-pectin interactions in aqueous solutions and in O/W emulsions," Colloids and Surfaces A: Physiochem. Eng. Aspects 298, 2007, 99-107.
Wendin, Karin, "Flavour and texture in sourmilk affected by thickeners and fat content," Food Quality and Preference, 1997, 8, 281-291.
Nakamura, Akihiro et al., "The stabilizing behavior of soybean soluble polysaccharide and pectin in acidified milk beverages," International Dairy Journal, 2006, 16, 361-369.
Janhoj, Thomas et al., "Sensory and rheological characterization of acidified milk drinks," Food Hydrocolloids, 22, 2007, 798-806.
Tamime, A. Y. et al. "Yoghurt: Science and Technology", Section 2, "Background to manufacturing," 2007, pp. 13-72.
Decision of Opposition Division dated Aug. 1, 2017, European Patent Application No. 13709241.

* cited by examiner

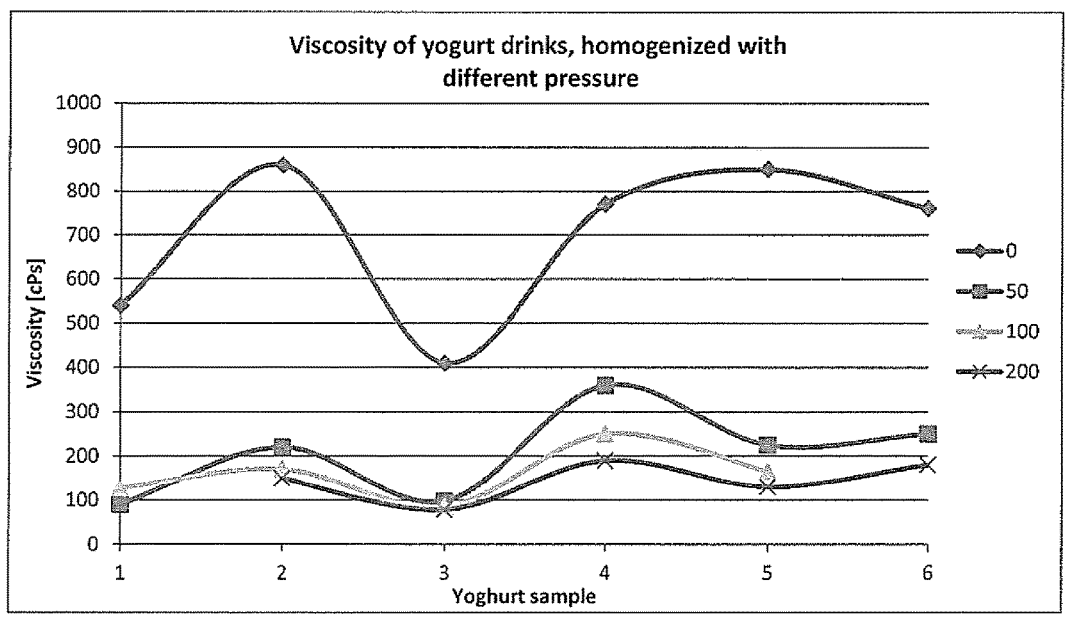

STABLE FERMENTED MILK PRODUCTS AND METHODS

CROSS-REFERENCE TO RELATED APPLICATIONS

This application claims priority under 37 C.F.R. §119(e) to U.S. Provisional Application No. 61/619,737 filed Apr. 3, 2012, and U.S. Provisional Application No. 61/714,107 filed Oct. 15, 2012, the disclosures of which are incorporated herein by reference.

FIELD OF THE INVENTION

The present application generally relates to fermented milk products and methods for making fermented milk products.

BACKGROUND

Pectin is a natural material that is abundantly present in plants, and thus is a major part of a typical human's diet. Pectin may be isolated from appropriate plant material by aqueous extraction, or other known methods. About 50,000 MT/year of pectin is commercially sold, mostly for use as an ingredient in industrially prepared foods.

Pectin generally is a water-soluble mixture of macromolecules with distinctly different macromolecular parts that can be present in different amounts. The main component of pectin is polymerized anhydrogalacturonic acid that has some of its carboxyl groups esterified with methanol. The percentage of the carboxyl groups that are methyl esterified is referred to as the degree of (methyl) esterification (DM).

Commercial pectin preparations are classified into HM-pectin (high methyl ester pectin) and LM-pectin (low methyl ester pectin) according to whether the DM is above or below 50. Pectin, in some instances, can include amidation and/or acetate esterification. The degree of amidation (DA) and the degree of acetate esterification D(Ac) are the numbers of amide groups and acetate ester groups, respectively, per hundred anhydrogalacturonic acid repeating units. Amidation usually only is significant in pectin samples that have been exposed to ammonia during their manufacturing.

Acidified Milk Drink (AMD) is a generic term that includes fluid products that contain protein of milk origin and are at least slightly acidic so that the proteins are prevented or inhibited from forming the suspension present in natural milk. Typically, in this context, "fluid" implies that the products are suitable for drinking. Fermented milk drinks, which include drinkable yogurt, are one type of AMDs. Fermented milk drinks can, in certain instances, be prepared from natural milk by fermentation with a bacterial culture so that the product attains an acidic pH, such as, for example, less than 4.4.

Other bacterial cultures may also be used for making similar fermented milk products like kefir and the Danish product Cultura. The lowered, i.e., acidic, pH of AMD may also be accomplished by using either fruit juices or food-compatible acids as ingredients together with the milk.

Typically, in natural milk that has not been acidified, protein exists as suspended bodies that are so small that they cannot be detected as individual bodies by ordinary vision; nor can natural milk be distinguished from a homogeneous liquid by the senses of the oral cavity. Natural milk, however, is white and opaque because the suspended bodies are large enough to disperse visible light. Under normal conditions in fresh natural milk, the protein bodies repel each other so that they do not aggregate into larger lumps. Upon lowering pH, however, the suspended protein bodies can lose their mutual repulsion, and aggregate. In certain conditions, this may lead to a gel with a network of aggregated protein particles, such as, for example, ordinary yogurt. Ordinary yogurt typically is eaten with a spoon.

In some instances, yogurt is reasonably stable during its normal shelf life. The signs of instability that may be observed, such as, for example, a small or moderate amount of whey exudation, are traditional and generally accepted by consumers. In contrast, if the curd is ruptured for making a fluid drinkable product, the aggregation tends to continue. If it does, the product may segregate into two or more phases that may appear notably different either by the way they look, or by how they feel in the mouth. For example, the protein may, if it is poured into a container, form visible lumps on the walls of the container. Typically, these traits are unappealing to the consumer. In some instances, another symptom of instability can be excessively high viscosity. The desired viscosity, in certain instances, depends upon customer preferences.

Pectin is one stabilizing additive that has been used to prevent the aggregation of suspended proteins in AMDs, thereby preventing the suspension from segregating into larger individual phases. It is believed that the pectin adsorbs to the sticky surfaces of the protein bodies, and the new surface (of adsorbed pectin molecules) is, in contrast to the old one, non-sticky. Other water-soluble polymers can stabilize in a similar way, for example, carboxy methyl cellulose, propylene glycol alginate, and soybean fiber.

In many current applications, pectin of fairly high DM is preferred. Not wishing to be bound by any particular theory, it is believed that segments in the pectin molecule with locally high presence of negatively charged unesterified carboxyl groups bind to the protein surfaces. The other parts of the pectin molecule are believed to create the hydrated non-sticky layer, because they, on one hand, are connected to the protein-binding pectin segments, but, on the other hand, they themselves possess more affinity to the serum phase and relatively less affinity for the protein surface. It is believed that pectin of fairly high DM works particularly well because it possesses the appropriate balance between molecular segments that adsorb to acidified protein and molecular segments with affinity for the serum. Notwithstanding the possible explanations, it remains a fact that commonly used pectins like YM-115, YM-150, and JMJ (CP Kelco), AMD 382 and AMD 453 (Danisco), and AYD 240 (Cargill) possess DM above 60.

The older published literature about AMDs (see, e.g., Glahn, P. E., PROG. FD. NUTR. SCI. 6, 1982, 171; and Glahn, P. E., et al. FOOD INGRED. EUR. CONF. PROC. 1994) describes processes in which the AMD manufacturers start with milk, either natural milk, or a dispersion of powdered milk in water, which is initially heated to eliminate microorganisms, then cooled to a temperature suitable for fermentation. The milk is then fermented after inoculation with a bacterial culture. When the fermentation process reaches the desired acidity, a solution of pectin is added to the milk, which is then stirred and homogenized. Therefore, the pectin is added after fermentation.

BRIEF SUMMARY OF THE DESCRIPTION

Methods are provided for making a fermented milk product, wherein a stabilizing additive is introduced before fermentation. The methods herein generally comprise (1) combining milk and pectin to form a mixture, (2) heat treating the mixture, and (3) fermenting the mixture. In some embodiments, the methods further comprise combining the milk and pectin with a low acyl gellan gum. In some embodiments, the methods further comprise homogenizing the mixture before the heat treating step. In further embodiments, the methods further comprise homogenizing the mixture after the fermenting step. Also provided in embodiments herein are the fermented milk products produced therefrom.

BRIEF DESCRIPTION OF THE DRAWINGS

FIG. 1 is a graph showing the effect of the homogenization pressure on the viscosity of drinkable yogurts.

DETAILED DESCRIPTION

It may be advantageous for manufacturers to add pectin to milk prior to the heat treatment that precedes fermentation. For example, adding the pectin before the heat treatment and fermentation may make it easier to prevent infections from unwanted microorganisms, since no ingredients would be introduced after the heat treatment. As another example, adding the pectin before the heat treatment and fermentation will allow the heat treatment and fermentation steps possibly to help in hydrating and dispersing the pectin, thereby reducing the risk of incomplete utilization of the pectin. Therefore, introducing pectin before heat treatment and fermentation may require less production equipment and/or present fewer hygiene hazard points. Stabilizing additives were added before fermentation in the process described in WO 2005/016027, but the stabilizing additives were intentionally depolymerized materials.

It is known, however, that the use of pectin stabilizers, such as the aforementioned HM-pectin stabilizers, does not lead to stable AMD products when the pectin is added to neutral milk before fermentation. Not wishing to be bound by any particular theory, there are three phenomena that may individually or jointly explain this failure. First, when HM-pectin is added to neutral milk, a so-called segregative phase separation occurs with the milk proteins. This implies that two aqueous phases develop, one being enriched in protein and deprived of pectin, the other being deprived of protein and enriched in pectin. Water may distribute to thermodynamic equilibrium between the two phases, and the pectin-enriched phase will attract the water, causing the protein-enriched phase to shrink to a smaller volume of higher protein concentration. The second phenomenon that may cause the above-described failures is that HM-pectin decays under neutral conditions, such as those in milk having a neutral pH. Pectin generally is most stable at a pH of about 4. At neutral pH, pectin of high DM is more vulnerable than pectin of lower DM. The third phenomenon that can frustrate the production of stable AMDs when pectin is used before the first heat treatment is that the acidity of pectin can lower the pH. The lower pH, in turn, can provoke irreversible aggregation of the proteins. In contrast to the two other unwanted effects, this third effect may be counteracted by adjusting pH with food-acceptable alkaline reagents by commonly known procedures.

It generally is desirable to provide AMDs of good stability, including those that are free from the macroscopic phase separation that results from the aggregation of suspended protein at low pH. While HM-pectin has until now been the preferred stabilizer for AMDs, it cannot successfully be added before fermentation. There are, however, advantages presented by the ability to add a stabilizing additive prior to fermentation.

Generally, pectin may be HM-pectin or LM-pectin depending upon the manufacturing process. Many pectins are commercially available. The pectin generally is produced from edible plant materials, with citrus peel accounting for the majority of commercial production, but apple pectin and sugar beet pectin also are commercially available. Therefore, sugar beet pectin is one possible stabilizing additive. It is a commercially available product, mostly sold for flavor oil emulsions and soft drinks. Sugar beet pectin has been used as a stabilizing additive for fermented (or otherwise acidified) milk drinks; for example, EP 0958746 discloses a process for producing a fermented milk product in which the sugar beet pectin is added to the milk after fermentation, but not before fermentation.

Methods are provided for producing a fermented milk product. Fermented milk products generally are made at least in part with fermented milk. In some embodiments, the fermented milk products herein include acidified milk drinks (AMDs), including liquid yogurt. Liquid yogurt, i.e., drinkable yogurt, includes yogurt products that have a relatively low viscosity compared to traditional yogurt that is consumed with a spoon.

Fermented milk products are prepared by fermenting milk. The milk used in the methods herein generally may include any milk that is suitable for human consumption. For example, the milk used in the methods herein may include bovine milk, soybean milk, goat's milk, powdered milk, sweetened milk, concentrated condensed milk, and processed milk fortified with minerals (such as calcium, vitamins, etc.). Any of the milks used in the methods may be whole, reduced fat, no fat milks, or a combination thereof. In one embodiment, the milk used in the methods herein is natural milk. As used herein, the term "natural milk" refers to any milk that does not require reconstitution with water. In another embodiment, the milk used in the methods herein is a powdered milk that may be dispersed in water, including deionized water. In a further embodiment, the milk used in the methods herein comprises a combination of natural milk and powdered milk that may be dispersed in water or the natural milk.

Generally, the milk used in the methods can have any acceptable protein content. For example, the protein content can range from about 1% to about 5%. In one embodiment, the protein content of the milk is about 3.4%, which is the protein percentage in bovine milk. The protein content in some embodiments, however, can be lower than 3.4%.

Generally, the stabilizing additive used in the methods herein may be a pectin. The pectin may be natural. Also, the pectin may having varying degrees of (methyl) esterification (DM), acetate esterification D(Ac), or amidation (DA). In one embodiment, the pectin has a degree of acetate esterification (D(Ac)) from about 10 and about 30%. In another embodiment, the pectin has a D(Ac) from about 15 to about 25%. In a further embodiment, the pectin has a D(Ac) of about 20%. In one embodiment, the pectin is an HM pectin with a degree of (methyl) esterification greater than about 50% (e.g., from about 55 to about 65%). In one embodiment, the pectin comprises sugar beet pectin. Sugar beet pectin generally is a polysaccharide that is extracted and refined from beets by techniques well-known in the art.

In certain embodiments, the mixture of milk and pectin may include one or more additional stabilizing additives, such as water-soluble soybean polysaccharide, HM-pectin, carboxy methyl cellulose, polyglycolic acid (PGA), locust bean gum, tamarind seed polysaccharide, gellan gum, xanthan gum, guar gum, tara gum, gum Arabic, kalaya gum, carrageenan, or agar.

In exemplary embodiments, a mixture of pectin includes gellan gum is used as the stabilizing additive. Desirably, the gellan gum is a low acyl gellan gum having an acyl content of less than 0.5%, less than about 0.3%, or less than about 0.2%. In such embodiments, the amount of pectin required to stabilize the product is reduced, as described below.

In some embodiments, the pectin is completely dissolved in the mixture of milk and pectin. In other embodiments, the pectin is partially dissolved in the mixture of milk and pectin. In further embodiments, the mixture of milk and pectin contains one or more additional additives that eases processing, improves the final product, or both. For example, in one embodiment the mixture of milk and pectin further comprises gellan gum. In one embodiment, the mixture of milk and pectin comprises a sweetener. For example, in one embodiment, the sweetener is at least one type of sugar. The sugar may be natural or artificial, and may be in the solid or liquid phase when added to the mixture of milk and pectin. Generally, any sweetener that is generally recognized as safe may be added to the mixture of milk and pectin.

Generally, the mixture may be homogenized before, during, or after the methods provided herein. Homogenization processes are well-known in the relevant art, and any may be used in conjunction with the methods. In one embodiment, the mixture is homogenized before the heat treating step. In another embodiment, the mixture is homogenized after the fermenting step, and may be cooled to a temperature of from about 10° C. to about 25° C. after the homogenization is complete. In one embodiment, the mixture is cooled to a temperature of about 20° C.

Generally, the heat treating step herein may include any of those well-known in the art. Typically, the heat treating step involves heating the mixture to a temperature that is sufficient to eliminate at least a majority of unwanted microbes. In one embodiment, the heat treating step comprises heating the mixture to a temperature of from about 70 to about 95° C. for about 5 to about 25 minutes (water bath 90° C.), or about 80 to about 90° C. for about 5 to about 25 minutes. In another embodiment, the heat treating step comprises heating the mixture to about 85° C. for about 15 minutes in a water bath. During the heat treating step, the mixture may be stirred. In some embodiments, a heat treating step is performed after fermentation so that the fermented milk product can be sold without live culture. Fermented milk products, such as yogurts, sold without live culture may have a longer shelf life (than those with live culture), not require refrigeration, or both.

In some embodiments, the mixture is cooled to a fermentation temperature of from about 35 to about 45° C. prior to fermentation. In one embodiment, the mixture is cooled to a fermentation temperature of about 42° C. prior to fermentation. Generally, any suitable fermentation process known in the art for producing yogurt products may be used in the methods. The fermentation process also may use any acceptable culture used for fermented milk products. The culture used in the methods herein may be YF-L903 or YF-L811 (Chr. Hansen A/S, Denmark). The fermenting step may include cooling the mixture to about 42° C., adding the inoculated culture to the mixture via pipette, placing the mixture in a fermentor at 42° C., and fermenting to a desired pH. In some embodiments, the desired pH is about 3.8 to about 5.0. In other embodiments, the desired pH is about 4.0 to about 4.8. In further embodiments, the desired pH is about 4.2 to about 4.5. In one embodiment, the desired pH is about 4.2

After the fermenting step, the resulting curd or curds may be broken by any acceptable means, such as with a perforated plate by pushing it to the bottom of the container that hosts the mixture. After breaking the curd, the mixture may be stirred.

Generally, any amount of pectin that is capable of imparting the desired properties to the final product may be added to the mixture of milk and pectin. In one embodiment, the weight percentage of pectin in the final product is from about 0.01 to about 5.0%. In another embodiment, the weight percentage of pectin in the final product is from about 0.01 to about 2.5%. In a further embodiment, the weight percentage of pectin in the final product is from about 0.01 to about 1.0%. In certain embodiments, the weight percentage of pectin in the final product is from about 0.1 to about 0.8%. In particular embodiments, the weight percentage of pectin in the final product is from about 0.2 to about 0.5%, from about 0.2 to about 0.4%, from about 0.25 to about 0.35%, from about 0.2 to about 0.3%, or from about 0.3 to about 0.4%.

In embodiments comprising a mixture of pectin and other stabilizing additives, such as gellan gum, the weight percentage of pectin in the final product may be less than that required to stabilize the final product when using the pectin without the gellan gum. For example, in an embodiment the weight percentage of pectin in the final product is from about 0.1 to about 0.5% and the weight percentage of gellan gum in the final product is from about 0.01 to about 0.05%. In an embodiment, the weight percentage of pectin in the final product is from about 0.2 to about 0.3% (e.g., 0.25%) and the weight percentage of gellan gum in the final product is from about 0.02 to about 0.03% (e.g., 0.025%).

The present invention is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims. Thus, other aspects of this invention will be apparent to those skilled in the art from consideration of the specification and practice of the invention disclosed herein.

EXAMPLES

Example 1—Testing of Pectin Samples and Preparation and Comparison of Fermented Milk Products with Different Stabilizers The pectins used in the examples were first tested by measuring the viscosities of a 2% solution of 8 g pectin in 392 mL of water at 25° C. with Brookfield LVT, 60 rpm, and the appropriate spindle (typically #1 or #2). Table 1 depicts the results and the characteristics of each pectin sample. All other analysis followed the procedure specified by FAO JECFA MONOGRAPHS 74 (71th JECFA, 2009), or, regarding the D(Ac) calculation, a similar method known to produce substantially the same results as the JECFA method. In Table 1, galacturonic acid is represented by "GA."

TABLE 1

Pectin samples, viscosities and characteristics

| | Sample | | |
|---|---|---|---|
| | LM 107 AS YA | Sugar Beet #1 GR 12342 | Sugar Beet #2 GR 01316 |
| % w/w of pure gum | 49 | 82 | 77 |
| % GA (in % w/w of pure gum part) | 87.6 | 70.7 | 68.8 |
| DM | 46.4 | 57.2 | 58.6 |
| DA | 11.4 | Not present | Not present |
| D(Ac) | Not present | 22.6 | 18.4 |
| Viscosity of 2% solution (mPa*s) | 33 | 33 | 70 |

The fermented milk products prepared in this example were drinkable yogurts. For comparison purposes, drinkable yogurts were prepared using the following stabilizers: LM 107 AS YA (C. P. Kelco, Atlanta, Ga., USA), sugar beet pectin, Fuji soybean fiber, and no stabilizer. LM 107 AS YA is a pectin produced from dried citrus peel. The citrus peel is processed to extract a pectin precipitate that is exposed to a mixture of ammonia, 2-propanol, and water, which results in the DA values shown in Table 1. The resulting pectin powder then is blended with sucrose for standardization, thereby compensating for natural raw material variations and ensuring batch-to-batch consistency with respect to the declared functional performance. For this reason, the weight percentage of pure gum is 49% in LM 107 AS YA, as shown in Table 1.

Since the two sugar beet pectins in Table 1 are not exposed to ammonia during processing, their DA values are 0 or insubstantial. Therefore, "not present" in Table 1 means that the samples lack the particular chemical feature entirely or contain an insubstantial amount. Also, the two sugar beet pectins are not combined with sucrose like LM 107 AS YA. Not wishing to be bound by any particular theory, it is believed that the weight percentage of pure gum in the two sugar beet pectin samples is less than 100% because a portion of the sugar beet pectin might dissolve in the acidified alcohol used during the analysis.

To produce the drinkable yogurt products, the dry ingredients were weighed out, and included 175 g of sugar and between 3.75 and 7.5 g of stabilizer. 2317.5 g of milk was then weighed out. The milk in this example was low fat milk (0.5% fat) (specifically, Mini-milk, a Danish commercial class of pasteurized milk).

1 sachet of freeze-dried culture dispersed into 1 liter of UHT milk (1.5% fat) was inoculated and placed in a fermentor for 2 hours at 42° C.

The dry ingredients—including the sugar and stabilizer—were then premixed. The premixture was then mixed into the 2317.5 g of milk with a high speed mixer (Silverson, 4800±200 rpm) to form a mixture. At this point in the procedure, the resulting mixture may be homogenized, for example, at about 60 to about 75° C. and about 150 to about 200 bar. None of the samples in this particular example, however, was homogenized at this point in the procedure.

The mixture was then placed in a water bath and heated to about 85° C. for 15 minutes (water bath 90° C.). The mixture was stirred with a large hook stirrer at 300 rpm. While stirring was maintained, the mixture was cooled to 42° C. The inoculated culture was then added to the mixture via pipette. The mixture was then placed in the fermentor at 42° C., and fermented to a pH of 4.45±0.05. The resulting curd was broken with a perforated plate by pushing it twice to the bottom of the beaker. The cultures used included YF-L903 and YF-L811 (Chr. Hansen A/S, Denmark).

The drinkable yogurt was then stirred for 30 seconds at 3800-4000 rpm with a high-speed mixer (Silverson). The drinkable yogurt was then homogenized at 200 bar at 20° C. or 40° C. (as indicated in Table 2). After homogenization, the mixture was cooled to 20° C., at which point it was placed into a container. The properties from the samples prepared in this example are shown in Table 2. The samples were observed visually, and assigned one of the following ratings (ranked best to worst): stable, stable but thin on top, stable but sediment at the bottom, unstable, or very unstable.

TABLE 2

Properties of drinkable yogurts (3.25% protein) from Example 1

| | Stabilizer | | | | | | |
|---|---|---|---|---|---|---|---|
| | LM 107 AS YA | | Sugar Beet Pectin #2 | | Fuji Soybean Fiber | | No Stabilizer |
| Stabilizer conc. (% w/w) | 0.15 | 0.25 | 0.20 | 0.30 | 0.20 | 0.30 | 0 |
| Visual appearance after homogenization at 40° C. | Unstable | Unstable | Stable but thin in top | Stable | Unstable | Unstable | Unstable |
| Visual appearance after homogenization at 20° C. | Unstable | Stable | Stable but thin in top | Stable | Stable but thin in top | Stable but thin in top | Unstable |
| Viscosity mPa*s after stirring, but before homogenization | 1080 | 1000 | 1080 | 1050 | 930 | 1010 | 940 |
| Viscosity mPa*s after homogenization at 40° C. | 135 | Not measured | 112.5 | 85.0 | 100 | 97.5 | 150 |
| Viscosity mPa*s after homogenization at 20° C. | Not measured | 260 | 29.5 | 12.5 | 24.0 | 17.0 | 87.5 |

For all of the drinkable yogurt samples prepared in Example 1, it was found that homogenization of the otherwise final fermented product reduced viscosity. When these yogurt drinks (with 3.25% protein) appeared visually homogeneous, low viscosity indicated their stability. In other words, the lower the viscosity, the better the stability. The results in Table 2 indicated that homogenization at 20° C. reduced the viscosity more than homogenization at 40° C.

The drinkable yogurt without stabilizer had viscosities of 150 mPa*s and 87.5 mPa*s after homogenization at 40° C. and 20° C., respectively.

At least in this particular example, LM 107 AS YA was less attractive than the other stabilizers because it provided higher viscosity vis-à-vis the other stabilizers at the same homogenization conditions. Following homogenization, the drinkable yogurt with 0.3% soybean fiber was better. Sugar beet pectin was, in this particular example, under-dosed when 0.2% by weight was used, but the viscosity of the sample with 0.3% by weight of sugar beet pectin had a viscosity lower than all of the other samples in Table 2, specifically, 85 mPa*s and 12.5 mPa*s after homogenization at 40° C. and 20° C., respectively.

Viscosity is used in this example and others as a quality control indicator, because another symptom of instability can be excessively high viscosity. The desired viscosity depends upon customer preferences, but it should be noted that it can be used as a fast metric for stability and thereby, with investigative work, save the waiting time for observing the progress of phase separation visually. If an AMD with more than 2% protein appears visually homogeneous, and it at the same time has less than about 50 mPa*s viscosity at room temperature, then it will usually be adequately stable for the normal shelf life of the class of fermented milk drinks that are sold with an active, living culture. The viscosity measurements were performed at 5° C. with Brookfield model LVT, 60 rpm, spindle 1 or spindle 2.

Example 2—Preparation of Fermented Milk Products with Sugar Beet Pectin

The fermented milk products made in this example were drinkable yogurts. Two batches of three drinkable yogurts were prepared, each drinkable yogurt having a different weight percent of sugar beet pectin. Each batch contained drinkable yogurts made from 2317.5 g of milk (low fat milk, 0.5% fat), 175 g of sugar and either 7.5 g, 10.0 g, or 12.5 g of sugar beet pectin. The drinkable yogurts were prepared according to the procedure described in Example 1, with one exception: in Example 2, each drink was subjected to the optional homogenization (at 60-75° C. and 150-200 bar) before the samples were heat treated, i.e., placed in a water bath and heated to 85° C. for 15 minutes. The characteristics of the drinkable yogurts of both batches are shown in Table 3:

The drinkable yogurt samples with 0.3% sugar beet pectin were acceptable, while the samples with higher sugar beet pectin dosages were less stable.

Example 3—Preparation of Fermented Milk Products with Sugar Beet Pectin

A series of fermented milk products having different weight percentages of sugar beet pectin stabilizer were prepared. The fermented milk products, which were drinkable yogurts in this example, included 1429 g milk, 889 g deionized water, 175 g sugar, and either 5.0, 7.5, 10.0, or 12.5 g sugar beet pectin, and were made according to the method described in Example 1 (without the optional homogenization before heat treating the samples). The characteristics of the samples prepared in this example are shown in Table 4:

TABLE 4

Properties of drinkable yogurts (2.0% protein) from Example 3

|  | Stabilizer Sugar Beet Pectin | | | |
| --- | --- | --- | --- | --- |
| Stabilizer conc. % w/w | 0.20 | 0.30 | 0.40 | 0.50 |
| Visual appearance after fermentation, prior to breaking of curd | Stable | Stable | Slight syneresis on top | Syneresis |
| Visual appearance after cooling to 20° C. and storing for 8 days | Stable | Stable | Stable | Unstable |
| Viscosity mPa*s after homogenization at 40° C. | 7 | 7.6 | 8.5 | 12.5 |
| Viscosity mPa*s after homogenization at 20° C. | 7.5 | 8.5 | 9 | n.d. |

As demonstrated in Table 4, the samples with 0.2% and 0.3% by weight sugar beet pectin were the most stable, while the stability decreased at the weight percentage of sugar beet pectin increased.

Example 4—Preparation of Fermented Milk Drinks Having Blends of Stabilizers

A series of fermented milk products were prepared using protocols similar to that used in commercial scale production. The fermented milk products, which were drinkable

TABLE 3

Properties of drinkable yogurts (3.25% protein) from Example 2

|  | Stabilizer | | | | | |
| --- | --- | --- | --- | --- | --- | --- |
|  | Sugar Beet Pectin (Batch #1) | | | Sugar Beet Pectin (Batch #2) | | |
| Stabilizer conc. (% w/w) | 0.30 | 0.40 | 0.50 | 0.30 | 0.40 | 0.50 |
| Visual appearance after cooling to 42° C. before fermentation | Stable | Unstable | Unstable | Stable | Unstable | Unstable |
| Visual appearance after stirring before final homogenization | Slight syneresis at top | Unstable | Unstable | Slight syneresis at top | Unstable | Unstable |
| Visual appearance after final homogenization at 40° C. | Little sediment | Unstable | Unstable | Little sediment | Almost stable but thin at top | Unstable |
| Visual appearance after final homogenization at 20° C. | Little sediment | Unstable | Unstable | Little sediment | Almost stable but thin at top | Unstable | yogurts, were prepared by blending two batches of yogurt (70% Yogurt Batch 1 and 30% Yogurt Batch 2) after fermentation of each batch, providing a fermented milk product having a final protein content of 2.8%. The blend was cooled to 25° C. while stirring approximately every 5 minutes, homogenized at 0, 50, 100 or 200 bar, poured into plastic bottles and viscosity glasses, and stored at 5° C.

The first batch (Yogurt Batch 1) was prepared using the process described in Example 1 to produce a yogurt having a final concentration of 2.5% protein. Different combinations of low acyl gellan gum (KELCOGEL®, C. P. Kelco, Atlanta, Ga., USA), sugar beet pectin (GENU® BETA Pectin, C. P. Kelco, Atlanta, Ga., USA), LM 107 AS YA, and starch were used as summarized in Table 5:

TABLE 5

Composition of Yogurt Batch 1 (% w/w)

| | Sample # | | | | | |
|---|---|---|---|---|---|---|
| | 1 | 2 | 3 | 4 | 5 | 6 |
| Milk (3.5% Protein) (% w/w) | 71.4 | 71.4 | 71.4 | 71.4 | 71.4 | 71.4 |
| Water (% w/w) | 21.56 | 21.20 | 21.06 | 21.21 | 21.41 | 20.11 |
| Gellan Gum (% w/w) | 0.043 | 0.043 | 0.043 | 0.036 | 0.043 | 0.043 |
| Sugar Beet Pectin (% w/w) | — | 0.358 | 0.5 | 0.36 | — | — |
| LM 107 AS YA (% w/w) | — | — | — | — | 0.15 | — |
| Starch (% w/w) | — | — | — | — | — | 1.45 |
| Sugar (% w/w) | 7.00 | 7.00 | 7.00 | 7.00 | 7.00 | 7.00 |

The second batch (Yogurt Batch 2) was prepared without the addition of any stabilizers using a process similar to that described in Example 1 with the exception that the mixture was cooled and fermented at a fermentation temperature of 38° C. for approximately 5 hours.

The drinkable yogurts produced by blending Yogurt Batch 1 with Yogurt Batch 2 are described in Table 6:

TABLE 6

Composition and properties of drinkable yogurts

| | Sample # | | | | | |
|---|---|---|---|---|---|---|
| | 1 | 2 | 3 | 4 | 5 | 6 |
| Gellan Gum (% w/w) | 0.030 | 0.030 | 0.030 | 0.025 | 0.030 | 0.030 |
| Sugar Beet Pectin (% w/w) | — | 0.251 | 0.350 | 0.251 | — | — |
| LM 107 AS-YA (% w/w) | — | — | — | — | 0.105 | — |
| Starch (% w/w) | — | — | — | — | — | 1.015 |
| Sugar (% w/w) | 4.9 | 4.9 | 4.9 | 4.9 | 4.9 | 4.9 |
| Visual appearance after cooling and storing for 2 weeks | Little Syneresis | Little Syneresis | Unstable * | Stable | Unstable | Unstable |

\* Although syneresis was observed in the blend having a final sugar beet pectin concentration of 0.350%, it is believed that this was caused by the high initial concentration of the sugar beet pectin in Yogurt Batch 1 of 0.5%.

The yogurt drinks were evaluated by measuring the viscosity of the drink 1 day after its preparation or by a visual evaluation of syneresis after 2 weeks. The viscosity of all yogurt drinks decreased with increasing homogenization pressure, as shown in FIG. 1; however, only slight differences in viscosity were observed as homogenization pressure was increased from 50 to 200 bar.

The yogurt drinks including the mixture of sugar beet pectin and gellan gum were generally stable after 2 weeks, as evidenced by the presence of little to no syneresis. The comparative yogurt drinks prepared using blends of gellan gum and either LM 107 AS YA or starch were unstable. However, the comparative yogurt drink prepared with only the gellan gum exhibited little syneresis, although more syneresis was observed for samples homogenized at 200 bar.

The present invention may be embodied in many different forms, and the specific illustrative embodiments exemplify the principles of the invention. It should be emphasized, however, that the present invention is not limited to the specific embodiments illustrated. Thus, other aspects of this invention will be apparent to those skilled in the art from consideration of the specification and practice of the invention disclosed herein.

We claim:

1. A process for preparing a drinkable fermented milk product comprising:
   combining a milk product and a pectin to form a mixture, wherein the pectin has a degree of (methyl) esterification greater than about 50% and a degree of acetate esterification D(Ac) from about 10 to about 30%; thereafter
   heat treating the mixture; and thereafter
   fermenting the mixture with a culture to produce the drinkable fermented milk product.

2. The process of claim 1, wherein the milk product comprises natural milk, a dispersion of powdered milk in water, or a combination thereof.

3. The process of claim 1, wherein the drinkable fermented milk product comprises a liquid yogurt.

4. The process of claim 1, wherein the pectin has a degree of methyl esterification greater than about 50% and less than about 65%.

5. The process of claim 1, wherein the pectin has a degree of acetate esterification D(Ac) from about 15 to about 25%.

6. The process of claim 1, wherein the pectin has a degree of acetate esterification D(Ac) of about 20%.

7. The process of claim 1, wherein the pectin comprises sugar beet pectin.

8. The process of claim 7, wherein the sugar beet pectin is completely dissolved in the mixture.

9. The process of claim 1, further comprising homogenizing the mixture before heat treating the mixture.

10. The process of claim 1, wherein during the heat treating, the mixture is heated to a temperature of from about 70 to about 95° C. for about 5 to about 25 minutes.

11. The process of claim 1, further comprising cooling the mixture to a fermentation temperature from about 35 to about 45° C. after heat treating the mixture and prior to fermenting the mixture.

12. The process of claim 1, wherein the fermenting step is continued until the pH of the mixture is from about 3.8 to about 5.0.

13. The process of claim 1, further comprising homogenizing the mixture and cooling the mixture to a temperature of from about 15 to about 25° C. after fermenting the mixture.

14. The process of claim 1, wherein the mixture further comprises sugar.

15. The process of claim 1, wherein the weight percentage of pectin in the drinkable fermented milk product is from about 0.01 to about 5.0%.

16. The process of claim 1, wherein the weight percentage of pectin in the drinkable fermented milk is from about 0.01 to about 2.5%.

17. The process of claim 1, wherein the weight percentage of pectin in the drinkable fermented milk is from about 0.01 to about 1.0%.

18. The process of claim 1, wherein the weight percentage of pectin in the drinkable fermented milk is from about 0.1 to about 0.8%.

19. The process of claim 1, wherein the weight percentage of pectin in the drinkable fermented milk is from about 0.2 to about 0.5%.

20. The process of claim 1, wherein the weight percentage of pectin in the drinkable fermented milk is from about 0.3 to about 0.4%.

21. The process of claim 1, wherein the step of combining the milk and pectin to form a mixture further comprises adding gellan gum to the mixture.

22. The process of claim 21, wherein the weight percentage of gellan gum in the drinkable fermented milk product is from about 0.01 to about 0.05%.

23. The process of claim 1, further comprising breaking a curd or curds that form during fermenting of the mixture.

24. A process for preparing a drinkable fermented milk product comprising:
    combining a milk product and a sugar beet pectin to form a mixture, wherein the sugar beet pectin has a degree of (methyl) esterification greater than about 50% and a degree of acetate esterification D(Ac) from about 10 to about 30%; thereafter
    homogenizing the mixture; thereafter
    heat treating the mixture; thereafter
    fermenting the mixture with a culture to produce the drinkable fermented milk product; and thereafter
    homogenizing and cooling the drinkable fermented milk product.

* * * * *